UNITED STATES PATENT OFFICE.

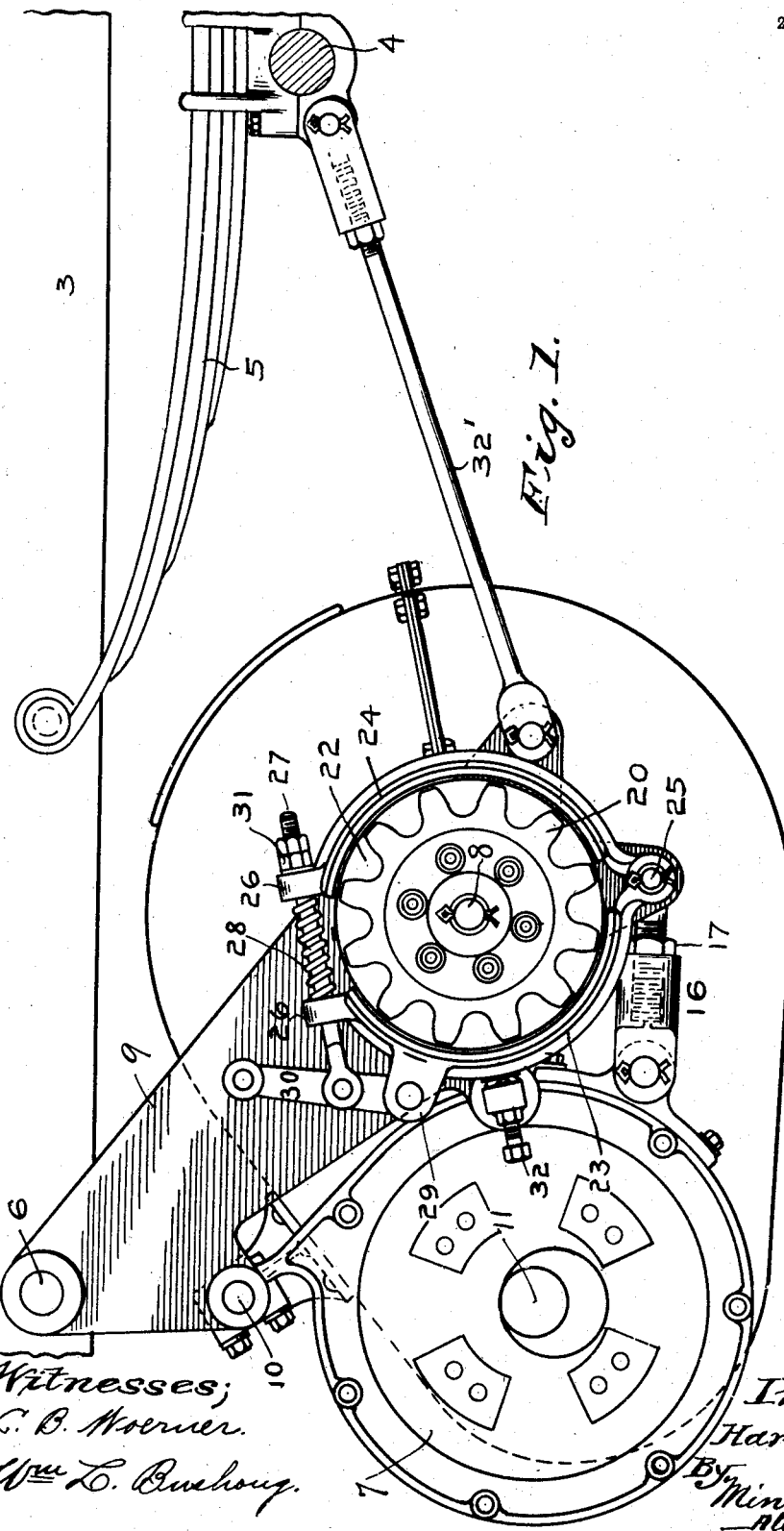

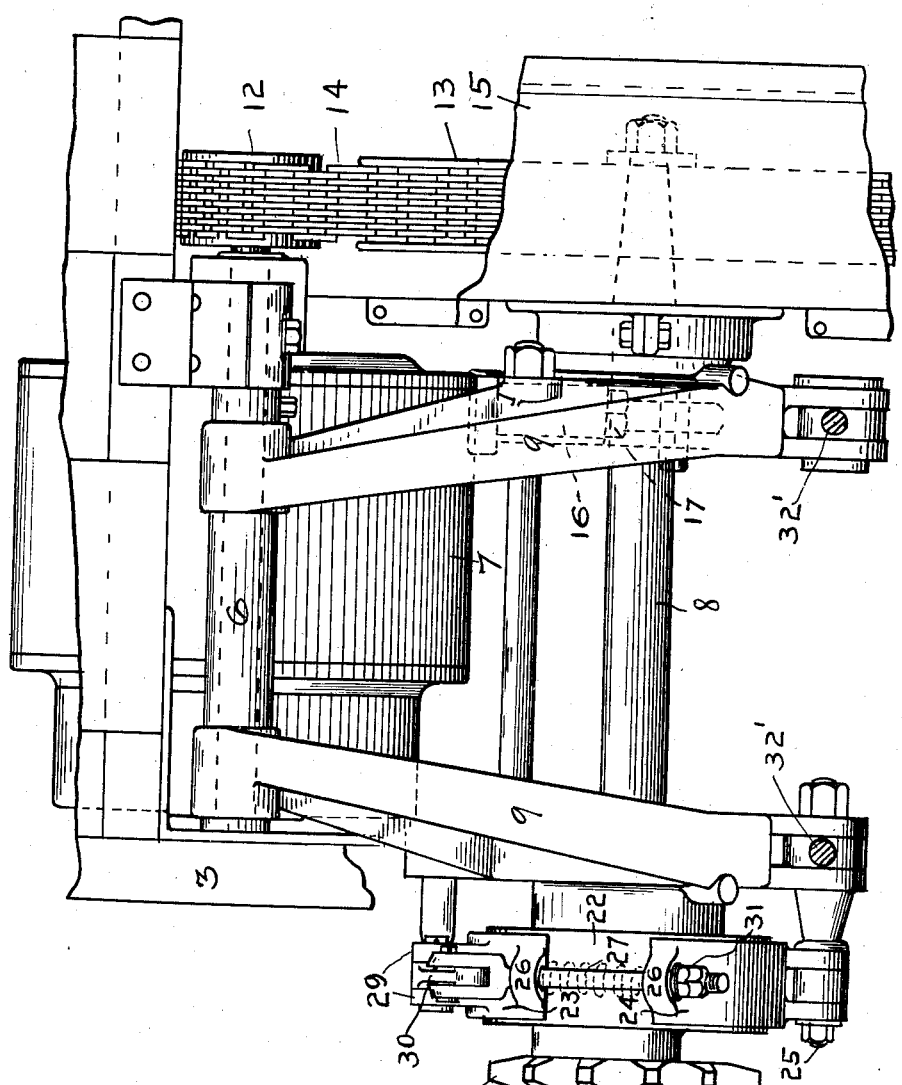

HAROLD H. KENNEDY, OF INDIANAPOLIS, INDIANA, ASSIGNOR TO THE WAVERLEY COMPANY, OF INDIANAPOLIS, INDIANA, A CORPORATION OF INDIANA.

MOTOR SUSPENSION AND DRIVE.

1,063,040.  Specification of Letters Patent.  Patented May 27, 1913.

Application filed June 28, 1911. Serial No. 635,893.

*To all whom it may concern:*

Be it known that I, HAROLD H. KENNEDY, a citizen of the United States, residing at Indianapolis, in the county of Marion and State of Indiana, have invented certain new and useful Improvements in Motor Suspension and Drive, of which the following is a specification.

One object of the invention is to assemble the motor and countershaft together for suspension as a unit from the machine frame whereby bench adjustment of the parts may be had in preference to chassis adjustment by less skilled mechanics.

Another object is to suspend said unit from the machine frame in advance of the center of gravity, and thus retain it, to lessen vibration and rattling by reason of pressure in one direction due to gravity.

Another object is to simplify the brake mechanism on the countershaft and render it more durable.

A further object is to simplify and improve the details of construction in various ways as will be hereinafter fully described and pointed out in the appended claims.

I accomplish the objects of the invention by the mechanism illustrated in the accompanying drawings, in which—

Figure 1 is a view in side elevation of a part of the frame and rear springs of a motor car showing my invention applied in operative position, and Fig. 2 is a detail in top plan view of my invention illustrated in Fig. 1.

Like characters of reference indicate like parts in the two views.

3 is the main frame of the car, 4 the rear axle, and 5 one of the rear springs.

6 is a shaft mounted transversely of the frame 3 and from which a unit comprising motor 7, countershaft 8 and associated parts is suspended by a pair of hangers 9. The countershaft 8 is mounted in suitable journals in the lower ends of the hangers 9 but the motor is pivotally suspended from a shaft 10 which shaft is supported by the hangers.

11 is the motor shaft on one end of which is a sprocket wheel 12 for a chain drive to the countershaft.

The countershaft 8 has a sprocket wheel 13 and is driven from wheel 12 of the motor by link belt 14. This transmission is protected by a gear case 15, which is supported from the adjacent hanger 9. The sprocket wheels 12 and 13 are spaced apart to keep belt 14 tight on them, by means of a distance rod 16 attached at one end to adjacent frame member 9 and at the other to the motor housing. As best shown in Fig. 1, this distance rod is in two telescoping parts, the inner of which is screw threaded to receive a nut 17 which bears against the end of the other part to limit the extension of the threaded rod into it. Mounted on the other end of the shaft 8 from sprocket 13 is a sprocket wheel 20 which is connected by a chain belt (not shown) with a suitable wheel (not shown) on the rear axle 4. Also mounted on shaft 8 adjacent to sprocket wheel 20 is a brake-drum 22 which is adapted to be embraced by a pair of brake shoes 23 and 24. The shoes 23 and 24 are hinged together by a bolt 25 which is supported from adjacent hanger 9. The shoes are curved to conform to the periphery of the brake-drum and terminate with perforated ears 26 through which a bolt 27 is passed. A spring 28, wrapped around bolt 27, between ears 26, spreads the two shoes normally apart to release the drum. The shoe 23 has ears 29 for the pivotal attachment of a lever 30. The upper end of lever 30 is connected by a rod (not shown) with a suitable operating lever (not shown) located within reach of the driver. One end of bolt 27 is pivotally connected with lever 30 at a point between the ends of the lever, and its opposite end is provided with nuts 31. The outward movement of shoe 23, away from drum 22, is limited by a stop-screw 32 supported from adjacent hanger 9, and the outward movement of shoe 24 is limited by nuts 31.

The operation of the above described brake is as follows: A movement of the upper end of lever 30 by the operator, in the direction of the arrow (see Fig. 1) draws shoe 24 into contact with the brake-drum, through bolt 27, and simultaneously presses the shoe 23 against the other side of the drum. The spring 28 is compressed by the above described operation, and upon release of lever 30 the tension of the spring immediately separates the two shoes and releases the drum.

At the lower ends of each hanger 9 are ears for the attachment of distance rods 32'. The other ends of rods 32'' are connected to the rear axle in the manner as shown in Fig. 1, to hold the hangers and the above described attached mechanism in a normal position as illustrated in Fig. 1. In this position the motor which is the heaviest part of the suspended unit is itself pivotally and independently suspended from the hangers supporting the unit to permit the adjustment of its distance from countershaft 8 for reasons heretofore stated, and to lessen the vibration and strain the shaft 10 is located immediately under the shaft 6 and the center of gravity of the unit suspended by the hangers 9 from shaft 6 is to the rear of a vertical plane through the axis of shaft 6, and the action of gravity being constantly toward that plane will lessen vibration and reduce rattling at the several swing-joints of the structure.

The above construction enables me to get the tie-rod in substantial alinement with countershaft 8 and motor shaft 11 which is obviously desirable.

By suspending the motor from the hangers independently of the suspension of the hangers from shaft 6, the motor, countershaft, drive mechanism and brake may all be adjusted at the bench before the resulting unit is attached to the frame 3.

Having thus fully described my invention, what I claim as new and wish to secure by Letters Patent of the United States, is—

1. A motor-car frame, and a structure suspended as a unit from said frame, said structure comprising hangers, a countershaft mounted in said hangers, an axle, means for adjusting the distance of the free ends of the hangers from the axle, a motor pivotally suspended from the hangers, the suspensions for said hangers and motor being in the same vertical plane, power transmission means between the motor and countershaft, and means for swingingly adjusting the suspension of the motor to vary the distance between the countershaft and armature shaft.

2. A motor-car frame, a countershaft supported by the frame, and a structure suspended as a unit from said countershaft comprising hangers, an axle, means for adjusting the distance of the free ends of the hangers from the axle, a second countershaft mounted in said hangers, a motor pivotally suspended from said hangers from a pivot in the same vertical plane with said first countershaft, a sprocket and chain belt transmission from the motor to the second countershaft, and a distance-rod adjustable in its length extending from the motor to the hangers to keep said chain belt taut.

3. A motor-car frame, a transverse shaft supported by the frame, a rear axle, a pair of hangers suspended from the shaft, distance rods connecting the ends of the hangers with the rear axle, a motor suspended from the hangers, the axis of the motor and of its suspension being in substantially the same vertical plane which passes through the axis of the shaft from which the hangers are suspended, and a countershaft journaled to the hangers and driven from the motor and means for swingingly adjusting the suspension of the motor to vary the distance between the axis of the motor and axis of the countershaft.

4. A motor-car frame, a transverse shaft supported by the frame, a rear axle, a pair of hangers suspended from the shaft, distance rods connecting the ends of the hangers with the rear axle, a motor suspended from the hangers, the axis of the motor and of its suspension being in substantially the same vertical plane which passes through the axis of the shaft from which the hangers are suspended, a countershaft journaled to the hangers, chain-belt transmission from the motor-shaft to said countershaft, and a distance rod extending from the motor to the hangers whereby the tension of said chain-belt may be regulated.

In witness whereof, I, have hereunto set my hand and seal at Indianapolis, Indiana, this 6th day of June, A. D. one thousand nine hundred and eleven.

HAROLD H. KENNEDY. [L. S.]

Witnesses:
 JOSEPH A. MINTURN,
 F. W. WOERNER.